United States Patent [19]

Balogh et al.

[11] 4,359,725
[45] Nov. 16, 1982

[54] METHOD AND APPARATUS FOR MONITORING THE ALERTNESS OF THE DRIVER OF A VEHICLE

[75] Inventors: György Balogh; Miklos Hajnal; Laszlo Vajta; Istvan Lovanyi; Laszlo Csenki, all of Budapest, Hungary

[73] Assignee: Elektromobil Elektroes Jarmuipari Szovetkezet, Gyor, Hungary

[21] Appl. No.: 212,192

[22] Filed: Dec. 1, 1980

[30] Foreign Application Priority Data

Nov. 29, 1979 [HU] Hungary ............................. BA 3893

[51] Int. Cl.³ ............................................. G08B 21/00
[52] U.S. Cl. ..................................... 340/576; 180/272
[58] Field of Search ......................... 340/576; 180/272

[56] References Cited

U.S. PATENT DOCUMENTS

| | | |
|---|---|---|
| 3,611,344 | 10/1971 | Couper . |
| 3,654,599 | 4/1972 | Sepper . |
| 3,794,968 | 2/1974 | Hill ........................................ 340/576 |
| 3,811,116 | 5/1974 | Takeuchi et al. |
| 3,922,599 | 11/1975 | Steingroever et al. . |
| 3,922,665 | 11/1975 | Curry et al. ........................... 180/272 |
| 4,005,398 | 1/1977 | Inoue et al. |
| 4,031,527 | 6/1977 | Yanagishima et al. |

FOREIGN PATENT DOCUMENTS

| | | |
|---|---|---|
| 2042853 | 3/1972 | Fed. Rep. of Germany . |
| 2404963 | 8/1974 | Fed. Rep. of Germany . |
| 612340 | 7/1979 | Switzerland ...................... 340/576 |

Primary Examiner—Glen R. Swann, III
Attorney, Agent, or Firm—Young & Thompson

[57] ABSTRACT

The electric power consumption of a vehicle having its own power source and travelling on an unbounded path is monitored; and, when this power consumption remains substantially constant for more than a predetermined period of time, the invention sends a signal to the driver, to which he must respond with predetermined accuracy and in a predetermined period of time. Failing this, the invention gives the operator a warning display and repeats the test which, if failed repeatedly, results in the equipment giving an alarm perceptible to those outside the vehicle, by the horn and/or flashing lights. In addition, the invention can preserve a record of the driving conditions and test results and can provide coded access to operation of the vehicle to prevent unauthorized entry. The invention can also provide a test of alertness which the driver must pass before actuation of the vehicle can be initiated.

14 Claims, 6 Drawing Figures

METHOD AND APPARATUS FOR MONITORING THE ALERTNESS OF THE DRIVER OF A VEHICLE

The invention relates to a process for sensing and controlling the decrease of activity of drivers of vehicles provided with an independent energy source and travelling on an unbounded path, especially in a monotonous situation.

The invention also relates to a complex electronic safety equipment which is able to sense the decrease of activity of the driver of a vehicle provided with an independent energy source in the course of the travel, simultaneously to control, to qualify and to register the ability for sensing and making a decision, the co-ordination of movements and the extent of attention.

By using the proper completing circuits, the equipment according to the invention may be rendered suitable for controlling the driver previous to putting the vehicle into operation in respect to alcoholic or pharmaceutical influence, at the same time the equipment is able to perform property protecting functions.

Although the process and the equipment have been primarily developed for road vehicles, especially automobiles travelling on public roads, both can be well used for controlling the alertness in case of any vehicle of transport or working machine.

BACKGROUND OF THE INVENTION

It is a well known fact, that the number of accidents resulting from inattention, tiredness, falling asleep etc. of the driver far exceeds the number of accidents caused by technical faults.

The pertinent statistics are show that in general 70% of the accidents may be attributed to these phenomena. About 20% of the accidents occurring on public roads in USA are the so-called "single-car" accidents, in which no vehicles of transport were taking part beside the vehicle that has undergone the accident. Due to the increased number of vehicles, building of highways, the increase of the volume of transport taking place on public roads and restriction of speed all over the world one may expect an increase of accidents of this type. It has been tried for a long time to ensure the alertness of the driver by means of an expedient "alertness controlling instrument" i.e. in case of decrease in alertness to avert an accident.

In one of the known technical solutions serving for this purpose, previously to the starting of the vehicle an arithmetical task or a task requiring skill is to be performed with the aim to hinder the starting of an extremely tired person or someone, who is influenced by alcohol or medicine. It is obvious that these instruments are absolutely unsuitable for monitoring tiredness in the course of driving.

Several types of equipment have been developed, which monitor tiredness by the cerebral waves, the movement of the eyes or the muscles. All these suppose the wearing of uncomfortable contacts on the body, and as a consequence have not come in general use.

It has been tried to produce stimuli in order to decrease monotony. Such equipment is described in the specification of U.S. Pat. No. 3,611,344 (corresponding to German Pat. No. 2,142,574).This equipment releases periodically repeated stimuli for the driver. The task of the driver lies in extinguishing the signal by using a manual switch. If it does not take place, the equipment stops the ignition of the motor or switches the emergency flashes. The drawback of the solution lies in that the rhythmical stimuli emitted increase monotony and when driving in the city and in dangerous situations the stimuli may divert the attention of the driver.

The equipment used in railways, described in the German Pat. No. 1,199,312, also serves this purpose. This equipment generates a warning signal in dependence of the speed of the vehicle, accordingly in a less foreseeable manner and rhythm; in connection with the so-called "dead-man" switch it is able to sense the decrease of the muscle-tone. Taking into consideration, that this equipment was developed for vehicles travelling on a bounded path—on a railroad—its application in road traffic becomes impossible.

With this last solution the inventions aiming at the production of "awakening" signals reached the limit of their possibilities. Further trials have been directed to the observation of managing the steering-wheel (oscillation). In this case the individual variation of the driving styles involved almost unsolvable problems. It soon became obvious, that the values are depending on the weather, the condition of roads and the technical parameters of the vehicle to such an extent, that the simple counting of oscillation became almost senseless (such solutions have been described in U.S. Pat. Nos. 3,322,639 and 3,106,987.)

The tendency of further development of such equipment is represented by the solution in German Pat. No. 2,404,963. It has been tried—by using the solution described—here to compare the measured oscillation values based on the samples taken in the single sections of the trip, however, this comparison could yield objective values only on long road-sections and with road-surfaces of constant quality.

The solution described in German Pat. No. 2,042,853 continuously controls the quality of the correcting movements beside the oscillation value. If it were possible at all to make all these rapidly or slowly changing parameters (e.g. the angle of inclination of the road, the quality of the tyres, ice, side-wind, the clearance of the steering-wheel, the load of the car etc) into consideration, which qualitatively determine the phenomenon of tiredness, objections could be raised in so far as the instruments mentioned before sense but the final state of the tiredness and do not take into consideration—they are not even able to do it—the peculiar anomalies of steering previous to falling asleep.

The equipment according to U.S. Pat. No. 4,005,398 tries to reduce the chances of superfluous alarms resulting from the incompleteness of the method and involving risks of accident. In this solution essentially the characteristic features of the solutions described in U.S. Pat. Nos. 4,031,527 and 3,322,639 have been combined. The basic principle lies in that the manoeuvres of driving are counted dependent on the speed, simultaneously the oscillation fluctuations of the steering-wheel are also observed. When one or the other of said data falls below the threshold value, an acoustic signal forewarning the driver is given. Thereafter the warning is automatically stopped.

At last—mainly due its original solution—attention should be given to the equipment according to U.S. Pat. No. 3,922,665. This equipment senses the increase of the threshold of hearing. The equipment releases a more and more intense acoustic stimulus for the driver, who has to extinguish the signal at the moment of sensing. Random character of the frequency of the stimuli is ensured by the fact, that the chance of occurrence is a function of the "sensing" period reckoned from the beginning of the generated signal to the moment of extinction. However, the threshold-value of hearing changes at extinction—in most ranges of oscillation—just inversely, (accordingly, it is not increased, but decreased) and its behaviour is influenced by numerous factors (not only by the level of the background-noise, which has been taken in consideration in our invention), that we have almost no other choice, than to assume the view previously described in connection with oscillation of the steering wheel.

As a consequence, the common drawback of the described devices lies in that they do not sense the objective symptoms of tiredness, the stimuli produced with the aim to "shake up" the driver may disturb him in a dangerous situation, besides the devices proposed are too complicated and their universal application is impossible.

The solution described in Hungarian Pat. No. 172,613 more approximates the ergonomically optimal control of alertness. The most important characteristic of said solution lies in that the pulses coming from the sensors of other operating organs of the vehicle connected at other places (and serving for different purposes) are immediately taken up into a function with a "real time" character, excluding the possibility of diverting the driver's attention. By means of this equipment a more objective phenomenon of tiredness—namely the extension of reaction time—may be controlled, i.e. the period, during which impulses are not received from the operating organs, simultaneously the results are registered by means of suitable auxiliary devices.

However, the drawback of said equipment lies in that the connecting up of the sensors represents a very wearisome task, i.e. when only the minimally needed three points (the brake, and the clutch, the steering-wheel) are connected up, the level of monotony ought to be observed for such a long unit of time, during which failure of attention could not be excluded. This problem pointedly arises in cars, which have different output at different rates of speed. As a further objection it can be stated, that a separate operating organ is needed for the response, while extension of reaction time can be evaluated within rather broad limits only compared to the real biological scale of values.

The most important reason for the necessity for finding a more suitable solution, than those, previously described, lies in that in accordance with the modern theories on monotony the primary reason for tiredness and becoming apathetic may be explained by their "predicted character" beside the lack of stimuli, independent of their rhythm (within wide limits), but depending on the fact, whether always identical, i.e. automatic reflex activity is produced. The solution according Hungarian Pat. No. 172,613—since the period passing till the warning signal is varied within narrow limits and always identical motion—in which reactions are required, cannot serve as an efficient weapon against monotony. Taking into consideration that only one single phenomenon of tiredness is observed, its extent of objectivity can be considered as sufficient only in comparison to other instruments.

The reasons described above led to the endeavor to approach the monitoring of the tiredness of the drivers from a new direction.

Almost every act of the driving process essentially consists of three biological phases: sensing, making a decision and handling.

In order to render this most complicated biological function "measurable" from several points of view, i.e. that we should be able to perform objective qualification, the following tasks have been set when designing the equipment and developing the process:

1. The process according to the invention and the equipment for performing said process should not disturb the activity of the driver while driving, that is, it should perform its function only in traffic situations, when the number of stimuli compelling the driver to handle and the level of driving activity are anyhow low.
2. In an unexpected accident dangerous situation the instrument is not allowed to divert the attention of the driver.
3. In a monotonous situation the instrument should be able to monitor the actual circumstances in such a manner, that a warning signal of unexpected character should be given at random intervals; when sensing said signal, first of all the driver has to interpret the content of the signal, he has to make the decision about the answer to be given, responding should take place by a suitably rapid series of motions, which are suitable for being analyzed as to its elements by means of the instrument.

On the basis of the data measured in the described manner, the following data could be defined immediately and electrically:
    (a) the reliability of sensing,
    (b) the rightness of the decision (compliance with requirements)
    (c) the rapidity of the reaction,
    (d) the co-ordination of the movements and
    (e) the state of the reflexes ensuring finer co-ordination.

4. The equipment should give an unambiguous "backward-signal" about the result of the control that the driver should be able to get synchronized with his own state of alertness and in knowledge of the same to choose the speed of driving or to stop.
5. The frequency of the controls should be in compliance with the decreasing or increasing level of alertness of the operator.
6. When sensing tiredness of a critical extent, the equipment should produce warning and alarming signals for calling the attention of the adjacent drivers to the danger or it should be able to stop the vehicle in said dangerous situations.
7. In order to be able to avoid senseless risk on behalf of the driver, the measuring results could be registered by means of suitable auxiliary equipment.
8. In the absence of of suitable auxiliary equipment, the instrument should be able to store at least the dates of the last control (e.g. for routine controls on the public ways, or for informing the authorities).
9. Optionally the equipment could be rendered suitable to hinder the participation of a person who is absolutely unsuitable for driving in traffic, prior to starting, in such a manner that only after having accurately and rapidly performed a task, which can be accomplished in a proper state of alertness only, starting of the vehicle should be possible.

10. Optionally the equipment should be suitable for the protection of property, i.e. it should give an alarm at the unauthorized opening of the parked car (or its trunk) and ignition of the motor (without an alarm) should be allowed only for a person knowing a special series of (electrical) signals.
11. In a monotonous situation the equipment should possibly monitor the extent of alertness of the driver continuously and quite from the beginning.
12. The equipment could be universally used for passenger cars, trucks and working machines, independently of their mode of operation, and an increase of the number of the operating organs of the vehicle should be avoided.
13. Assembly should be simple (and non-professionals should be able to perform it), and low production costs should enable its general and widespread use.

SUMMARY OF THE INVENTION

Both the process and the equipment, suitable for performing the process according to the invention are based on the fundamental recognition, that the level of activity of the driver and its decrease, are not to be determined by means of sensors connected to operating organs, but by the observance and sensing of the electrical changes taking place in the entire energy network of the vehicle, having been restricted as to and amplitude, by using one single electrical connection.

In such a manner almost every motion of driving can be observed, so e.g. beginning from switching on the radio or using the cigarette-lighter, continuing with the change in the number of revolutions of the motor, up to the use of the brake-lights, the horn, the direction indicator, and the lamp indicating reverse driving.

In order to avoid diverting the attention of the driver in the course of the control in an unexpected dangerous situation (the second requirement, above), the pulse of the sensing circuit observing the stability of the energy network (e.g. braking, acceleration) is accepted as a response in the course of the monitoring and measuring the alertness and simultaneously control is postponed.

Under monotonous circumstances (the third requirement) (lack of pulses for at least 120 seconds, the alertness of the driver is monitored in the following manner: after a previously indetermiate period, one of the turn signals (RIGHT or LEFT) on the instrument board is switched for maximally three seconds (in the absence of such lamps one of the "instruction" lamps arranged on the front panel of the apparatus may be used for this purpose). In the course of switching a short "preparatory" horn—call can to be heard. The right or left direction of the "instruction" lamp is not predictable, the mode of operation differs from the usual, as a consequence in these cases a continuous light may be observed. The task of the driver is to put the arm of the direction indicator in the direction corresponding to the signal at the moment of sensing and to put it back immediately into its middle position.

During the performance of the series of response the equipment is measuring the following:
the time elapsing between the beginning of the signal and the appearance of the response voltage expediently with an accuracy of the hundreth of a second, (the so-called reaction time of selection),
the duration of the electric signal between switching of the direction indicator and taking back the same, representing a datum characteristic of the coordination of the series of motions and the quality of the reflexes, and which is especially extended under the influence of alcohol; the identity of the direction of response-motion with that of the instruction is also observed.
the overhasty or confused character of the motion based on the observation, whether the turn signal lever has stopped during displacement backward, or passing the middle, it has given a pulse also to the conductor on the opposite side.

In order to avoid the occurrence of an outer turn signal misleading adjacent drivers, the response-voltage is delayed for a predetermined duration (e.g. shorter than 0.5 sec) accordingly in this case the turn signal is unable to switch on. The most frequently used hot-wire turn signals now in use are also working with such a delay and (under normal circumstances) in 0.5 sec the corrective movement can be performed without any difficulty.

The measuring results are evaluated in the equipment in a complex way, the individual data are weighted according to their driving function and are evaluated and signalled to the driver e.g. either by the combination of light-diodes of different colours (green, yellow, red) or by means of a digital display (e.g. 1 to 99, the fourth requirement above).

A weighted evaluation can be provided, e.g. in such a manner, that the duration needed for simple sensing or reversing the direction of movement in order to perform correction, is taken into consideration in a proportion of 1:4, but compared to normal biological values; the response-motion having been performed in an improper direction is signalled back as a "measuring to be repeated", while the overrun motion is signalled back as an "insufficient" result.

When the driver becomes tired, the deterioration of the values measured en route by our equipment does not exceed e.g. 25%. In order to obtain better perceptibility of the process, it seems to be of greater use to employ a digital display, but a solution may be proposed too in the sense that, after every repeated switching, automatically a signal is released—compared to the following first measuring result—when the state of alertness of the driver decreases by more, say, than 20%.

In order to be able to avoid the misleading effect of the manoeuvres produced by the driver with the aim of a deliberate delay (which can be produced e.g. in such a manner, that in course of the control the instrument is silenced by means of a "consumer" pulse, e.g. by the use of the horn) such an absence of measuring is answered by the equipment according to the invention by a further measuring trial, which is continued as long as a control suitable for evaluating appears.

Simultaneously, the duration of the following "sensing of the level of activity" is also programmed electronically, (fifth requirement, above); and in an inverse ratio to the measured capacity of "alertness" (e.g. infinitely varied within the range between 8 and 120 seconds).

In case the driver did not give any response despite the "preparatory" horn-signal and the lighting of the "instruction" lamp for 3 seconds (sixth requirement, above) and no driving manoeouvre (i.e. a motion consuming electric current) is performed, the equipment maintains the mode of measuring operation (i.e. "repeated measuring") for a further two seconds, simultaneously releasing the horn-signal, hereafter—sensing the absence of response—the alarm is immediately given.

In the course of the generating activity the outer emergency flash-lights of the vehicle are switched-on, the horn emits a discontinuous sound, but in case of necessity the ignition of the engine can be interrupted and the brake put into operation. The generating activity can be ceased only by stopping the vehicle.

The result obtained in the course of the repeated measurement is reported by the equipment with the proper evaluation of the "fault points".

The measured results are registered on a circular diagram by the equipment in a manner similar to that of the solution according to Hungarian Pat. No. 172,613, e.g. by the control of the pulse transmitter of tachographs of the types Kienzle TCO 15-5 and TCO 15-6 seventh requirement, above).

In the case of vehicles not provided with a tachograph, the official acceptability of the measured results after an accident (or in the course of a routine control on the road) are ensured by the equipment in such a manner, that the circuit surveying the "display" of the existing last control is kept in operation by means of an independent supply voltage even after having switched-off the operational supply voltage applied in course of the travel (turning-off the ignition key, or releasing the hand brake). The requirement of input (power consumption) of said circuit may be neglected and after having put the equipment repeatedly into operation, the last "stored" measuring result is automatically reproduced in a coloured or digital display (eighth requirement, above).

In the knowledge of the functions described, the equipment according to the invention can be made suitable for preventing the use of the car by incompetent persons or those under the influence of alcohol or medicaments (ninth and tenth requirements, above). Taking into consideration, that in course of the measurements taken en route, the equipment evaluates the signals arriving from the switch of the direction indicator of the car as a response given by the driver to the warning signals, it is able to sense (and measure) the order of sequence and duration of the voltages obtained by the signalling of the direction to the right or to the left even in a stationary position.

Accordingly, by using suitable supplements, the equipment can perform the following accessory functions:

When stopped, after having pressed a concealed push-button, the equipment is placed in a so-called "state of vigilance". In this case its supply voltage is independent of the ignition-key, and the energy requirement of the functioning circuits can be neglected. In the next phase, under the influence of the second "consumer's signal" appearing at any time on the sensor serving for the observation of the activity signal in the course of the control of alertness (the former can be e.g. the illumination of the inner space of the car, switched on, when the driver leaves the car), the equipment turns to the so-called "identifying" mode of operation. In course of this the equipment awaits (e.g. for 5 to 15 seconds) the performance of the sequence of special movements, i.e. the beginning of the same, from the person who is entering the car.

This sequence of motions is nothing but switching the arm of the direction indicator at least four times, but exclusively in the order of sequence that has been coded into the equipment (play back of a code).

The change of the directions to the right or to the left four times yields 16 combinations of the signals, out of these only one will represent the "key" of a given car.

Reckoned from the first index-signal (of proper direction) the equipment begins to measure the time elapsed until the fourth (last) signal. If this value exceeds a biologically acceptable minimal level (e.g. 3.5 seconds), the fact of unfitness will be indicated. In this case the cycle with the "identifying" phase is started as many times as the suitable measuring result is obtained.

In case, if within the "identifying phase" one single displacement in the wrong direction is sensed, our equipment immediately concludes the fact of "incompetence". When the proper signals are not coded into the equipment during the waiting time of the "identifying phase", incompetence will be supposed. The same happens, when reckoned from the beginning a subsequent consumer's pulse arrives from the sensor (e.g. the use of a starter).

After having found incompetence, the equipment automatically switches to the previously described alarm-operation (emergency flash-lamps, outer horn), but it may finally break the ignition circuit.

The alarm can be stopped only by repeated pressing of the hidden push-button. A repeated use of the same, however, starts only from beginning the phase of vigilance.

So, that the push-button does not finally exclude this function, the effect may be achieved, in that the driver under the influence of alcohol is unable to start the car even in the knowledge of the place of the button. (Should somebody not press the hidden button, when leaving the car, he takes the risk of theft on himself). The change of at least four directions of motion within about 3.5 seconds—to be performed in predetermined directions—as well as coding requiring continuous concentration, are rather more complicated tasks than can be performed by a drunken person.

For the sake of good order it should be mentioned, that no special operating organ within the car is needed, since control takes place by means of the arm of the direction indicator.

Taking the above into consideration, our invention relates to a process for sensing and controlling the decrease of activity and the level of alertness of the driver of vehicles provided with an independent energy source and travelling on an unbounded path, especially in monotonous situations, in course of which the changes in the energy use of the car caused by the driving activity of the driver are observed and signals corresponding to the speed and magnitude of said changes are generated, by the aid of which the emission of the signals destinated for the driver are suspended, in the absence of the appearance of the changes taking place in the energy used on a proper level and for a predetermined duration, an instruction signal is given to the driver. When sensing these signals, the driver has to make the proper decision and to give the corresponding response-signal, and in the absence of the response-signal or in case of an erroneous signal, an alarm signal in one or two stages is released.

The safety equipment suitable for performing the process according to the invention is another object of our invention. It is equipment provided with an independent energy source and the usual circuit components (e.g. ignition switch, handbrake—control lamp, horn, lighting, a direction indicator switch and any other electrical devices needed for the operation of the vehicle, to be used for cars travelling on an unbounded path, which is suitable for monitoring the tiredness of the driver, especially in monotonous situations, taking the speed and the magnitude of the changes in electrical consumption caused by the activity of the driver into consideration. The equipment comprises an arrangement generating the warning signal for the driver and a circuit-arrangement for generating the response-signal, to be actuated by the driver, furthermore it comprises lamps for signalling the instructions, and may include a registering apparatus; optionally the equipment may comprise a circuit-arrangement for determining the driving ability of the driver at the start (whether he is under the influence of alcohol or medicaments) and giving protection against unauthorized intrusion. The equipment can be characterized in that to the terminal (ungrounded), not connected to a body) of an accumulator (ACCU) as energy source or to a conductor connected to the ungrounded terminal and leading to the electrical consumers, a circuit is connected for observing the changes in current, through which the current of the consumers flows, the selective signal outputs of which are connected to signal lamps signalling the instructions, e.g. index-control lamps, or "instruction" lamps, which are connected to the selecting circuits of the selecting switch for forwarding the response of the driver.

DESCRIPTION OF THE DRAWINGS

The process and the equipment according to the invention will be described in detail by means of a preferred embodiment, by the aid of the accompanying drawings, in which.

Figure 1:
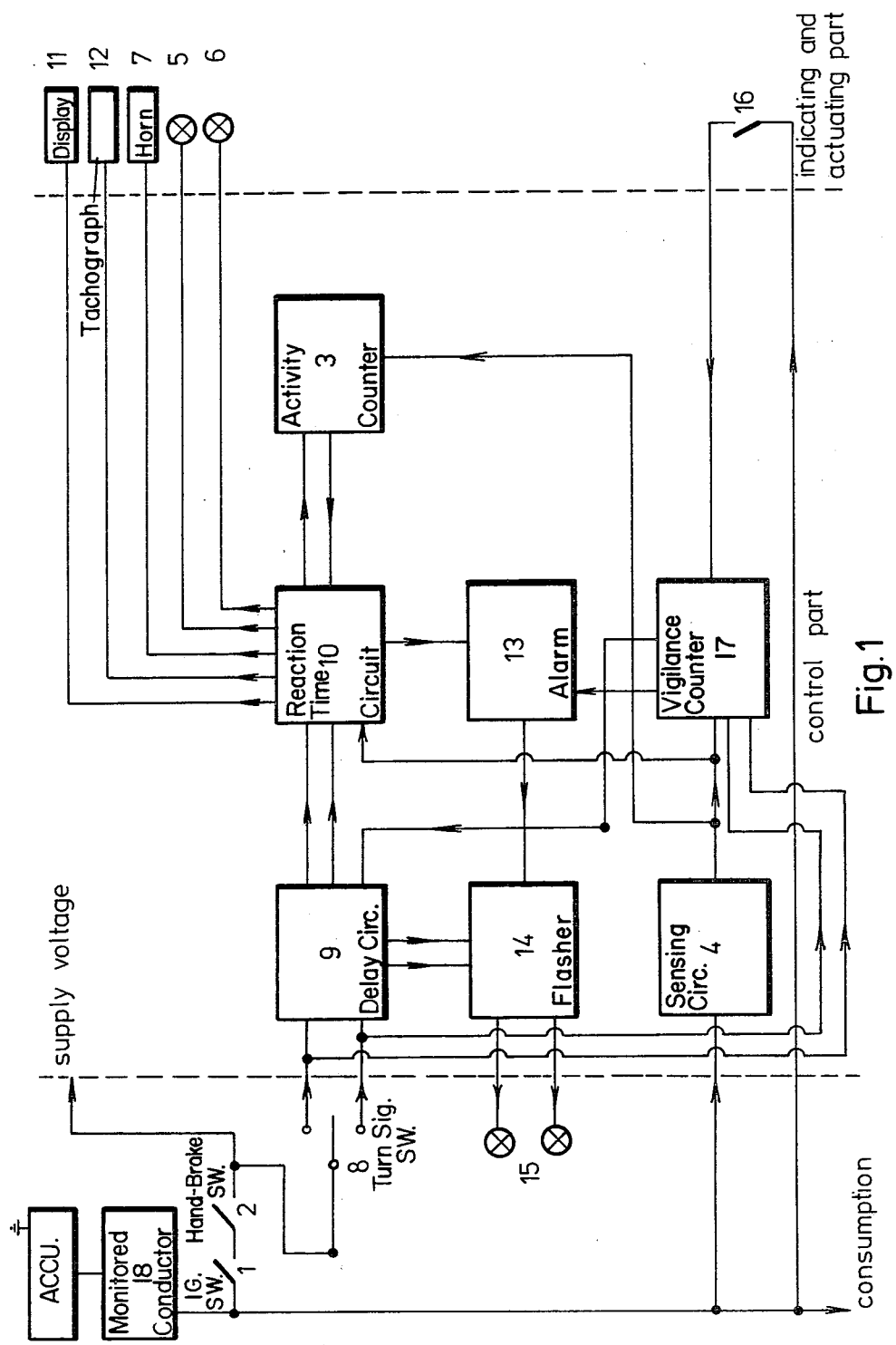
FIG. 1 is a block schematic diagram of a solution according to the invention.

The drawing show the invention relating to a car.

DETAILED DESCRIPTION OF THE INVENTION

In the block schematic diagram illustrated in FIG. 1 one of the terminals of the accumulator ACCU representing the energy source is connected to the body, while to the other terminal a section 18 of the conductor is connected. The current flows through said conductor to the different consumers. On one hand the supply voltage of the vehicle, and on the other the terminals of the equipment according to the invention are connected through the ignition switch 1 and the hand-brake switch 2. The equipment itself consists of three parts, namely the signalling part, the controlling part and the displaying and operating part. The equipment described here as an example, comprises a sensing circuit 4 sensing the magnitude and speed of the current changes. A counter 3 counting the level of activity is connected to said sensing circuit 4, while—by interposing a delay circuit 9—a direction indicator switch 8 is connected to a circuit 10 measuring the reaction time, whereas the circuit 10 is connected by means of a bilateral connection to the counter 3 counting the level of activity.

An alarm unit 13 is connected to the circuit 10 measuring the reaction time, the output thereof is connected to a flashing automaton 14, the output of which is connected to the outer emergency flashing lights 15 of the vehicle. Instruction-signal lamps 5 and 6, a horn 7, a display 11 and a tachograph 12 are also connected to the circuit 10 measuring the reaction time.

In FIG. 1 a vigilance-counter 17 has been also illustrated, which can be operated by means of a push-button 16. The vigilance-counter 17 essentially forms the basis of a circuit protecting against unauthorized intrusion and a circuit monitoring the state of the driver.

After having switched the ignition switch 1 to be seen in FIG. 1 and actuated the hand-brake switch 2—which is closed by releasing the hand-brake—the equipment sensing and controlling the decrease of the activity and level of alertness of the driver is put into operation, that means that the counter 3 counting the activity level begins to work. The sensing circuit 4 senses the speed and the magnitude of the change in the current flowing through the section 18 of the conductor and gives pulses—corresponding to the sensed values—to the counter 3. The counter 3 counting the activity level returns to zero under the influence of the pulses coming from the sensing circuit and generated by the driving activity of the driver. In the absence of such a pulse, after the expiration of a predetermined period, one of the instruction lamps 5,6 lights up, simultaneously the horn 7 also emits a sound. In order to answer the instructions, the driver has to make the decision and turn the direction indicator switch 8 in the direction corresponding to the instruction of the lighting lamp, then return it immediately to its middle-position without lighting up the outer direction indicating lamps. In a given case the instruction lamps may be replaced by the control lights showing the direction, when separate control lamps are available for both directions. The response signal arriving from the direction indicator switch 8 will be evaluated by means of the circuit 10 measuring the reaction time by interposing the delay circuit 9. On the basis of the evaluation, suitable signals are fed to the display 11 and the tachograph 12. Simultaneously, the duration of activity level to be considered next time as the counter 3 counting the activity level is also programmed. During the measuring process any pulse coming from the sensing circuit 4 causes a delay.

If the driver gives an improper answer or if he does not give an answer at all, —improper answer is given by turning the arm of the direction indicator switch 8 in the wrong direction—, the alarm unit 13 becomes activated and puts the outer emergency flashing lights 15 into operation through the flashing automaton 14.

Hereinafter, possible embodiments of the single blocks of the arrangement illustrated in FIG. 1 will be described.

Figure 2:
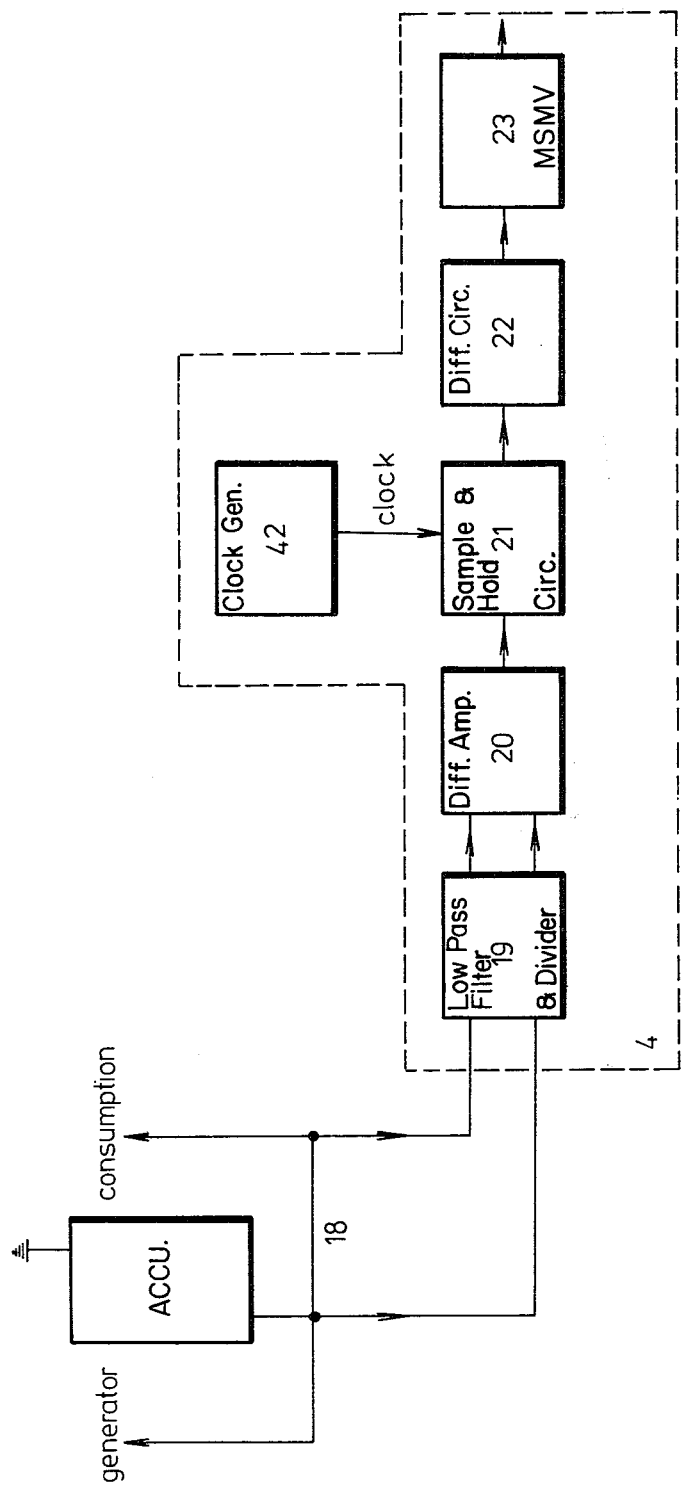
FIGS. 2 to 5 show details of the blocks of the arrangement according to FIG. 1, serving as an example.

In FIG. 2 a possible embodiment of the sensing circuit 4 may be seen.

In our example the input signal of the sensing circuit 4 sensing the changes in current is delivered by the voltage drop across the section of the conductor 18. A low-pass filter and divider circuit 19 ensures the elimination of the high-frequency noise resulting from ignition and other sources. After having been brought to the corresponding signal level by means of the differential amplifier 20 and after separation of the low-frequency changes, occurring within the current network of the vehicle-switching on and off of the power consumers-may be detected by the aid of a sampling and holding circuit 21. By the expedient choice of the period of sampling (clock pulse) generated by a clock pulse generator 42 changes in the voltage of different speeds (magnitudes) can be discriminated.

Under the influence of the sensed changes in voltage the differentiating circuit 22 delivers the pulses needed for starting the monostable circuit 23. Within this block the lower threshold value of the magnitude of the change in voltage takes place during the sampling period, during which the monostable circuit 23 does not function.

The possibilities of intervention enumerated here ensure the discrimination of the connected consumers and driving activities on basis of the speed and magnitude of the changes in voltage.

The voltage arriving at the input of the sensing circuit 4 contains the voltage drop depending on load, arising from the internal resistance of the accumulator ACCU and from the interposed section of the conductor 18 (which can be e.g. the cable between the acccumulator and the ignition switch 1) as a consequence, it is well suited for sensing all the activities of the driver, which involve the switching of the electrical consumers. These are the following (taking the approximate values as a basis and related to a passenger car:)

ignition: 50 W
self-starter: 1.3 kW
horn: 60 W
brake lamp: 42 W
turn signals: 50 W
subdued-town-long-distance light: 100/20/100 W
light horn: 90 W
heating: 20 W
windshield wiper: 25 W
optional other consumers Besides the consumers enumerated the sensing circuit 4 senses the quick changes in the electrical network of the vehicle caused by a sudden change of the number of revolutions. Simultaneously the state of the small power consumers (e.g. control lamps, oil pressure indicator) is left out of consideration. This is mostly motivated by the fact that the change does not take place as a consequence of the activity of the driver (e.g. the rate of power input of the radio).

In order to ensure the possibility of application in cars of different types, the minimal sensed voltage can be adjusted by adjusting the amplifying factor of the differential amplifier 20 and the comparing level of the comparator input of the monostable circuit 23, whereas the speed can be adjusted by the proper choice of the sampling frequency (at a higher frequency the sensing circuit 4 senses quicker changes).

The conductor 18 is comprised preferably by the cable between the accumulator ACCU and the ignition switch 1, at the same time the change of the consumption can be well characterized by the change of the consumption at the non-grounded point of the accumulator (in general the positive terminal).

At the input of the low-pass filter and divider circuit 19 there is a resistor divider with a dividing rate of about 1:2, furthermore it contains a filter with a cutoff frequency of about 10 Hz, assembled from an operation amplifier, which simultaneously performs the task of the differential amplifier 20. In such a manner the low-pass filter and divider circuit 19 and the differential amplifier 20 are advantageously a single unit.

At the input of the sampling-holding circuit 21 there is e.g. a FET-switch, which is switched by a clock signal of approximately 1 Hz. The clock signal is generated by a clock signal generator 42. The input switch transfers the output of the differential amplifier 20 with a given frequency to a condenser, and ensures a high-impedance separation. The voltage of the condenser is forwarded by a FET output stage towards the differentiating circuit 22. In the most simple embodiment this is a RC-member, which produces a pulse from the voltage skip.

The input stage of the monostable circuit 23 is formed by a comparator circuit, which does not pass the pulses below a certain predetermined level into the starting circuit of the monostable circuit 23. The latter is a transistorized or integrated basic circuit arrangement which can be started both with a negative and with a positive pulse.

Figure 3:
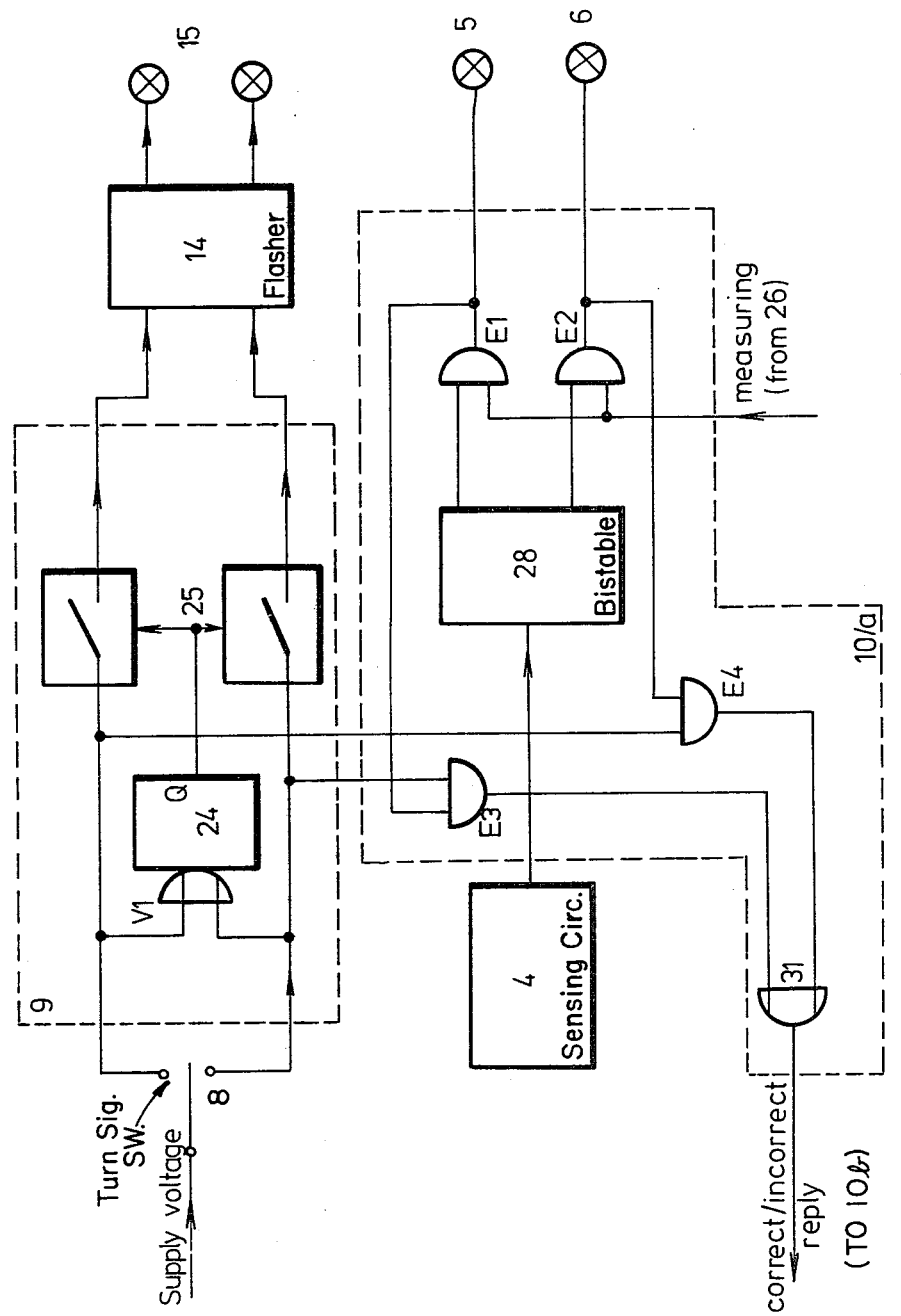

The equipment awaits the response-signal of the driver on the direction indicator switch 8 when monitoring the level of alertness. In order to prevent superfluous direction signals, the delaying circuit 9 is interposed—as already mentioned—between the flashing automaton 14 and the direction indicator switch 8. The delaying circuit 9 gives priority to the closing of one of the contacts of the direction indicator switch 8 on the input of the flashing automaton 14 with a delay of at most 0.8 sec in such a manner, that the monostable circuit 24 within the delay circuit 9, which starts upon the activation of the direction indicator switch 8, interrupts the connection between the direction indicator switch 8 and the flashing automaton 14 for the period mentioned above, by actuating an interrupting (connecting) circuit 25, either by using relays or semi-conductors (FIG. 3).

The frequency of monitoring the level of alertness depends on the activity level of the driver. The counter 3 counting the activity level controls the frequency of supervision. This may consist of a programmable counter 26 (FIG. 4), which is present under the influence of the pulses arriving from the sensing circuit 4 to an initial value determined by the result of the previous measuring process. As a consequence, the programmable counter 26 receiving the signals of the low frequency clock pulse generator reaches its saturated state only if a pulse indicating a driving activity does not arrive for a period characteristic of the activity level.

A more serviceable solution lies in that, when the interval between two measuring processes is restricted by an upper limit, e.g. in such a manner, that after a certain number of pulses arriving from the sensing circuit 4 the counter is no longer at the originally defined initial value, only a short delay is allowed until the beginning of the measuring process.

After having reached the saturation level of the programmable counter 26 of the counter 3 counting the level of activity, the measuring phase is started. This phase begins with a short sound of the horn 7 and with the random lighting up of one of the instruction lamps 5,6.

The random character is obtained by the circuit 10 measuring the reaction time (FIG. 1) e.g. in such a manner, that the pulses arriving from the sensing circuit 4 tilt the bistable circuit 28 and the output thereof selects the signal lamp 5 or 6 to be lighted (FIG. 3).

Figure 5:
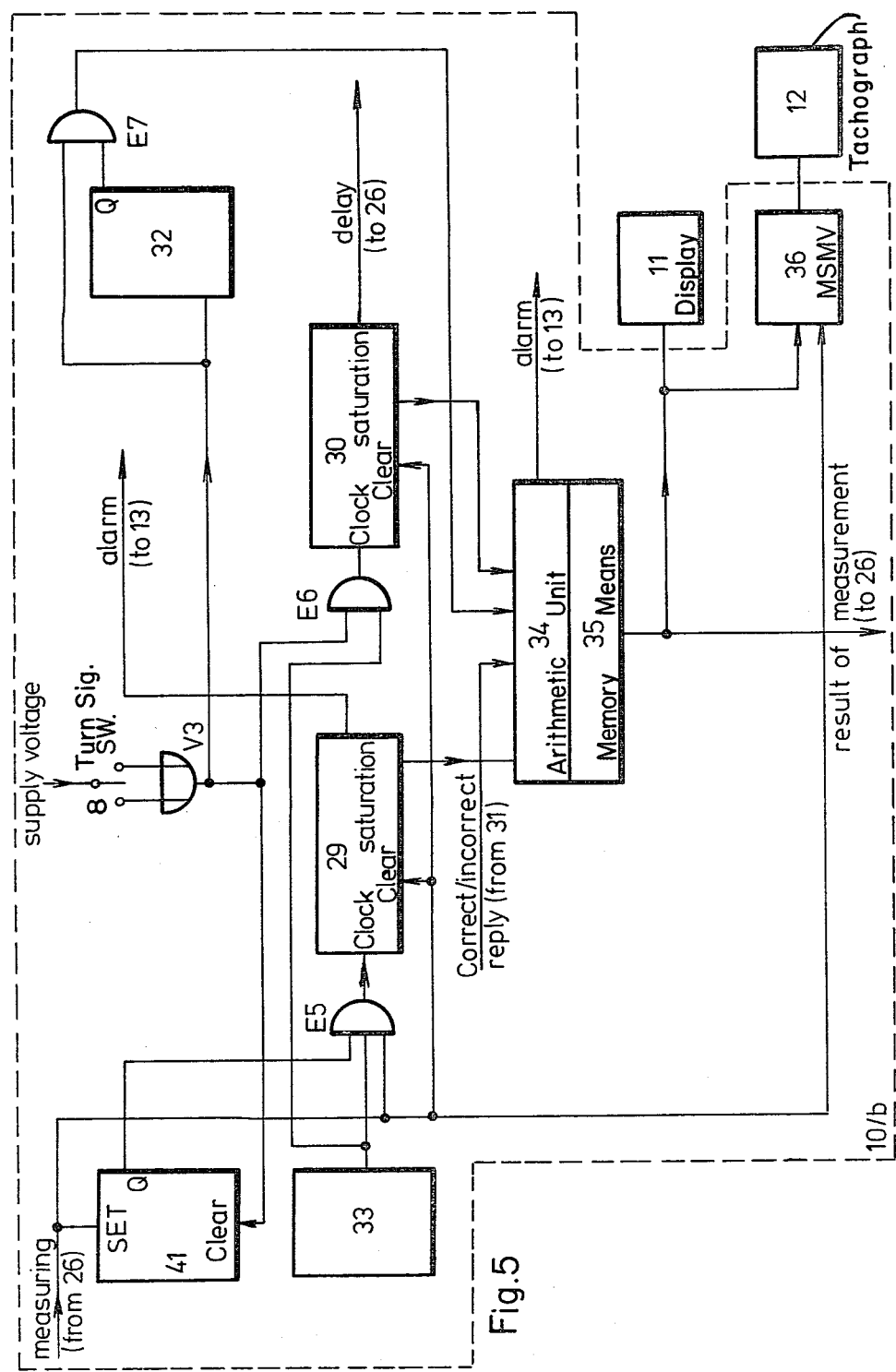

For the sake of good order we wish to remark, that the part 10a of the circuit 10 measuring the reaction time is to be seen in FIG. 3, while the part 10b thereof is illustrated in FIG. 5.

Evaluation of measuring takes place by means of the parts 10a and 10b of the circuit 10 measuring the reaction time. Qualification is the result of weighting the measuring results of four different parameters. These data are the following:

the counter 29 measures the time elapsed between the beginning of the measuring process and the appearance of the answer; for the duration of the measuring the activating and storing unit 41 activates the "clock" input of the counter 29;

the length of the response-pulse is measured by the counter 30.

The correctness or incorrectness of the response-pulse is detected by the combination network (FIG. 3) comparing the output of the bistable circuit 28 with the response pulse.

The co-ordinated character of the response-motion, i.e. the appearance of the pulse following the answer within a short time, coming from the opposite side, is controlled by the monostable circuit 32 starting at the end of the response-pulse (FIG. 5).

The clock-pulse of the counters 29 and 30 serving for measuring the time, generated by the clock-pulse generator 33, is selected for 1 kHz, enabling a resolution of 0.001 sec. The arithmetic unit 34 illustrated in FIG. 5 determines qualification on the basis of the contents of the counters 29 and 30, weighting the values under the conditions of the combination network 31 and the monostable circuit 32. In respect to current supply the storing element 35 storing said data, is independent of the position of the ignition switch and enables the storing of the last measuring result.

For displaying the measuring result any type of display 11 can be used, expediently a digital display is used.

For registering the pulse which is proportional to the measured result on the tachograph 12, the monostable circuit 36 can be advantageously used, the timing of which depends on the measuring results, while the start is synchronized with the end of the measuring process. (The tachograph 12 may also work with pulses with modulated signals).

Figure 4:
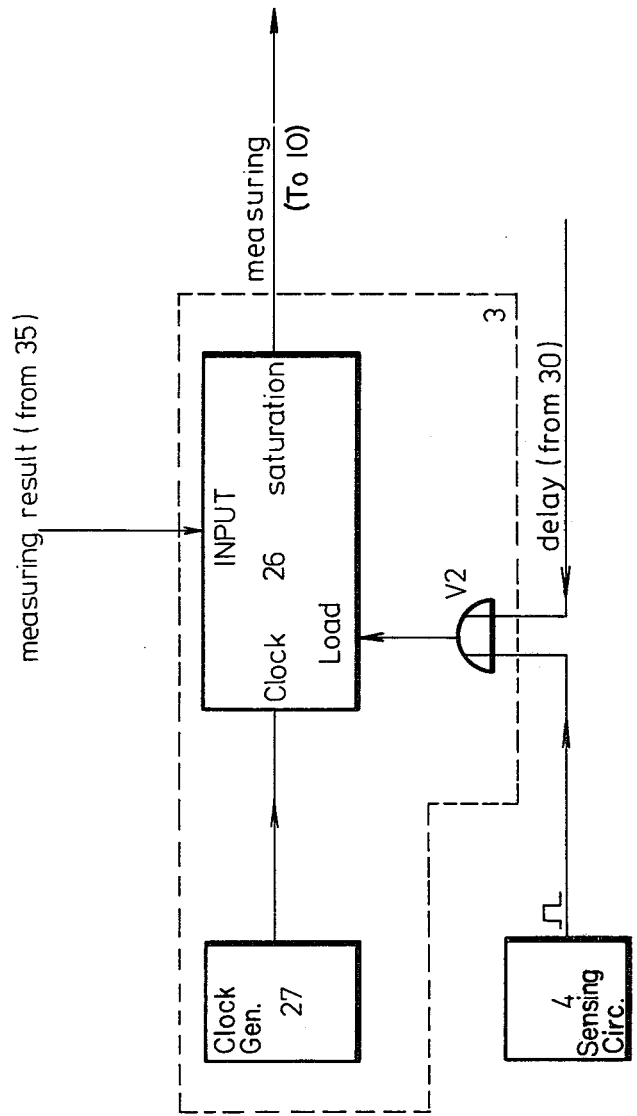
Figure 6:
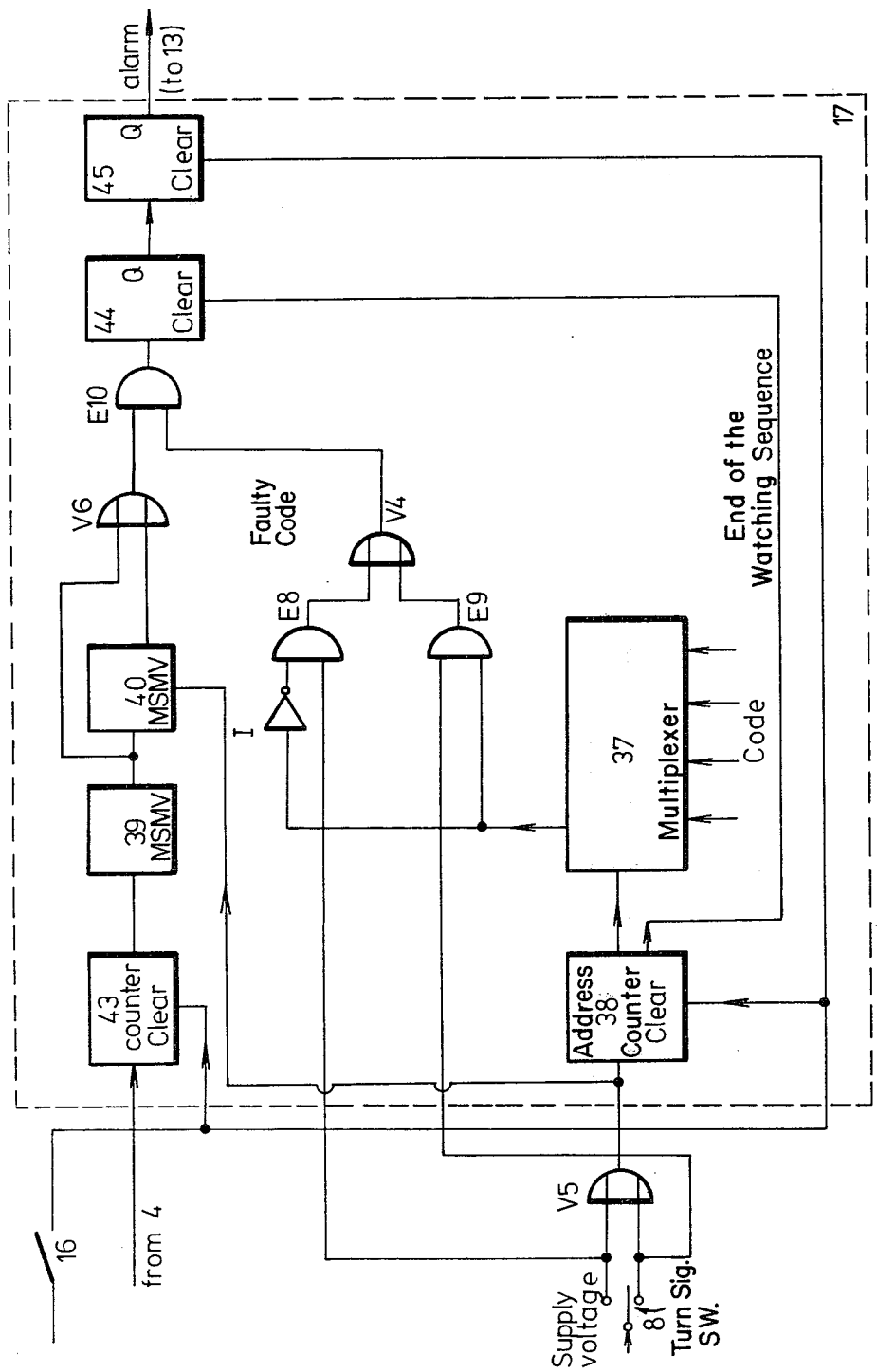
FIG. 6 shows the circuit arrangement forming an accessory part of the equipment, for monitoring the fitness of the driver and for protection against unauthorized intrusion.

The part 10b of the circuit 10 measuring the response time—which is an evaluating unit—actuates the alarm unit 13 in an overflow state of the counter 30 (an answer did not arrive). Overflow of the counter 30 (presumably no answer was given, but the indication of the direction took place), or the pulse coming from the sensing circuit, causes the delay of the measuring process (FIG. 4). In the state of vigilance the function of the vigilance counter 17 according to FIG. 1 is to sense the correctness of the code-combination "played back" by the driver. A possible mode of realization lies in that the direction of the correct response is defined by the output of a multiplexer 37 (from 1 to 1, in a general case from n to 1). The multiplexer-addressing, counting circuit 38 is incremented by the actuation of the direction indicator switch 8 in either of the directions. The inputs of the multiplexer 37 are connected to the logical level "0" and "1" and thereafter the desired sequence is set (programmed). (FIG. 6).

The input of the vigilance counter 17 is formed by a counter 43, to which the timing, consisting of the monostable circuits 39 and 40 is connected. Under the influence of the second pulse coming from the sensing circuit 4, following the switching to the state of vigilance, the first monostable circuit 39 starts, and after the expiration of timing it switches to alarm, only if playing back of the code has not begun. The playing back of the code-combination starts the second monostable circuit 40, which at the end of timing is switching to the alarm via the flip-flop 44, only if playing back of the code—setting the flip-flop 44—has not been finished. On the other hand the output connected to the alarm unit 13 will be immediately activated via the flip-flop 45 when the code is played back in a wrong way. The alarm taking place under any condition, activates the alarm unit 13 according to FIG. 1, which switches on the emergency flashing lights 15 and the horn 7 of the car via the flashing automaton 14. When the alarm unit 13 is activated in the absence of the answer, inactivation may take place via the handbrake-switch 2 only, whereas in a state of vigilance inactivation becomes possible through the hidden push-button 16. It goes without saying, that in this case the vigilance counter 17 is repeatedly activated.

In the drawings the theoretically needed AND-connections E1...E10, the OR-connections V1...V6, as well as the inverter I are indicated.

The solutions illustrated in the drawings, serving as an example, contain the essential information, on the basis of which any technician is able to practice the invention without difficulties.

What we claim:

1. A method for monitoring the alertness of the driver of a vehicle having an independent power source and traveling on an unbounded path, comprising continuously measuring the electrical consumption of a driven vehicle; giving signals to the driver, which signals require a response from the driver, in the event the electrical consumption of the vehicle remains substantially constant for more than a predetermined period of time, thereby indicating monotonous driving conditions; measuring the speed and accuracy of the responses of the driver to said signals; and giving an alarm when the speed and accuracy of the driver's response are below a predetermined level.

2. A method as claimed in claim 1, and giving said alarm only to the driver, giving further signals to the driver, determining the speed and accuracy of the driver's response to said further signals, and if the speed and accuracy of the driver's response to said further signals are below said predetermined level, giving a further alarm perceptible to persons outside the vehicle.

3. The process as claimed in claim 1, and determining said electrical consumption as changes in the electric current in an electric conductor of an electric power circuit of the vehicle.

4. Safety apparatus for vehicles traveling on an unbounded path and having an electric power supply system, for monitoring the alertness of the driver, comprising means for measuring the electrical consumption of a driven vehicle; means for giving signals to the driver, which signals require a response from the driver, in the event the electrical consumption of the vehicle remains substantially constant for more than a predetermined period of time, thereby indicating monotonous driving conditions; means operable by the driver in response to said signals; means for measuring the speed and accuracy of the responses of the driver to signals; and means for giving an alarm when the speed and accuracy of the driver's response are below a predetermined level.

5. Apparatus as claimed in claim 4, and the last-named means giving said alarm only to the driver, means for giving further signals to the driver, means for determining the speed and accuracy of the driver's response to said further signals, and if the speed and accuracy of the driver's response to said further signals are below said predetermined level, means for giving a further alarm perceptible to persons outside the vehicle.

6. Apparatus as claimed in claim 4, said measuring means measuring said electrical consumption as changes in the electric current in an electric conductor of an electric power circuit of the vehicle.

7. Apparatus as claimed in claim 4, in which said means operable by the driver comprises a turn signal switch of the vehicle.

8. Apparatus as claimed in claim 4, comprising an activity level counter (3) responsive to said electrical consumption measuring means to initiate said signals when electrical consumption is substantially constant and being connected through a two-way connection to actuate a circuit (10) measuring the driver's response time, a delay circuit (9) controlling said measuring circuit (10) and disposed between said measuring circuit (10) and the terminals of a turn signal switch (8) of the vehicle, said measuring circuit (10) controlling lamps (5,6), a horn (7), a visible display (11) and an alarm (13).

9. Apparatus as claimed in claim 8, said measuring circuit controlling also a tachograph (12).

10. Apparatus as claimed in claim 8, said alarm (13) controlling flashing lights (15) external to the vehicle.

11. Apparatus as claimed in claim 10, in which said delay circuit (9) comprises a monostable circuit (24) connected to an interrupting-connecting circuit (25).

12. Apparatus as claimed in claim 8, said means for measuring electrical consumption comprising a circuit (4) sensing the magnitude and rate of change of current in said system, said sensing circuit supplying signals to said activity level counter (3).

13. Apparatus as claimed in claim 12, said sensing circuit (4) comprising a low-pass filter and divider circuit (19) and a differential amplifier (20) connected to said low-pass filter and divider (9), said amplifier (20) sending signals to a sampling-holding circuit (21) whose output is connected via a differentiating circuit (22) to a monostable circuit (23) and thence to said activity-level counter (3), and a low-frequency clock pulse generator (42) connected to another input of said sampling-holding circuit (21).

14. Apparatus as claimed in claim 12, including means to protect against unauthorized intrusion of the vehicle comprising a push button (16) for actuating a vigilance counter (17), the vigilance counter (17) having an input connected to the output of said sensing circuit (4), said vigilance counter (17) having other inputs connected to outputs of the direction indicator switch (8) for receiving a code identifying an authorized driver and of and output for actuating the alarm unit (13) on absence of such a code for a predetermined period following actuation of said push button 16.

* * * * *